United States Patent [19]

Jager, deceased et al.

[11] 4,194,404
[45] Mar. 25, 1980

[54] CRANK ASSEMBLY FOR RECIPROCATING PISTON MACHINES

[76] Inventors: Valentin Jager, deceased, late of Darmstadt, Fed. Rep. of Germany; by Klara B. E. Jager, heir, Saalbaustrasse 40, D-6100 Darmstadt, Fed. Rep. of Germany

[21] Appl. No.: 923,919

[22] Filed: Jul. 12, 1978

Related U.S. Application Data

[63] Continuation of Ser. No. 744,468, Nov. 24, 1976, abandoned.

[30] Foreign Application Priority Data

Dec. 5, 1975 [DE] Fed. Rep. of Germany ....... 2554687

[51] Int. Cl.$^2$ ............................................. F16H 21/22
[52] U.S. Cl. .......................................... 74/44; 74/580; 123/52 A; 123/55 A
[58] Field of Search ............... 123/52 A, 192 B, 55 A; 74/44, 51, 580

[56] References Cited

U.S. PATENT DOCUMENTS

| | | | |
|---|---|---|---|
| 1,854,238 | 4/1932 | Thompson | 74/44 |
| 2,166,909 | 7/1939 | Kahn | 74/580 |
| 2,174,981 | 10/1939 | Kahn | 74/44 |
| 2,264,484 | 12/1941 | Sharpe et al. | 74/580 |

*Primary Examiner*—C. J. Husar
*Assistant Examiner*—Conrad Berman
*Attorney, Agent, or Firm*—Burge & Porter Co.

[57] ABSTRACT

A crank assembly for coupling a plurality of connecting rods to a common crank pin of a crankshaft includes an articulation member journaled on the crank pin. The articulation member carries a plurality of knuckle pins arranged in a radial array about the crank pin. Auxiliary cranks interconnect the articulation member and the body of the machine to limit freedom of movement of the articulation member and to assure that it does not rotate in space as it moves with the crank pin in a circular path around the axis of the crankshaft. The described assembly is particularly useful with reciprocating piston machines of the type having a radial array of cylinders with pistons movable in the cylinders, and permits the use of identical connecting rods, each drivingly connecting a separate one of the knuckle pins and a separate one of the pistons. Moreover, each of the auxiliary cranks can be used either as an additional power transmission input or output for the system.

12 Claims, 4 Drawing Figures

CRANK ASSEMBLY FOR RECIPROCATING PISTON MACHINES

CROSS REFERENCE TO RELATED APPLICATION

This is a continuation of application Ser. No. 744,468 filed Nov. 24, 1976, now abandoned.

BACKGROUND OF THE INVENTION

1. Field of the Invention

The present invention relates to a crank assembly for drivingly interconnecting a plurality of connecting rods to a common crank pin of a crankshaft.

2. Prior Art

Reciprocating piston machines of the type employing a radial array of cylinders with pistons movable in the cylinders are well known. By way of example, radial engines of this type have had extensive use in propellor driven aircraft.

In machines of this type, one proposed construction calls for a plurality of connecting rods to be coupled directly to a common crank pin. Where this approach is taken, it is common to provide one of the commonly coupled connecting rods with a bifurcated end which journals the crank pin at two axially spaced locations, and to journal the remainder of the commonly coupled connecting rods on the crank pin at locations between the bifurcations in an effort to balance the forces which are applied to the crank pin. Ordinarily, however, it has not been feasible to connect more than two connecting rods to a common crank pin.

Another proposal utilized in radial engines has been to designate one of the connecting rods as a master connecting rod, and to articulate other connecting rods on the master rod. The master rod is used for timing control, and the auxiliary rods transmit power to the master rod. Since the auxiliary rods are not connected directly to a crank pin but rather to the master rod at various individual points along the length of the master rod, the movement rates of the master rod and of the auxiliary rods do not always conform and thereby give rise to difficulties in balancing the system for smooth, optimum operation.

A problem common to both of these proposals has been that of design freedom being limited with regard to such factors as the number of pistons that can be employed, the stroke length, and connecting rod lengths and configurations. Moreover, each of these proposals calls for the use of a number of differently configured, specially formed connecting rods. Still another drawback has been an inherent lack of symmetry of the system components, and this has required the use of compensating measures such as adjustments in timing gears and in the positioning of camshaft cams for actuating inlet and exhaust valves.

These and other drawbacks may explain the reluctance to employ radial piston engines for wider fields of application, for example, to power land driven vehicles, particularly motorcycles. Radial engines are much quieter in operation than are other types of internal combustion engines and would therefore be especially advantageous for use on motorcycles to replace the extremely noisy engines commonly used on these vehicles.

SUMMARY OF THE INVENTION

The present invention overcomes the foregoing and other drawbacks of the prior art by providing a novel and improved crank assembly for drivingly interconnecting a plurality of connecting rods to a common crank pin of a crankshaft.

In preferred practice, the crank assembly includes an articulation member which is journalled on a crank pin of a crankshaft. The articulation member carries a plurality of knuckle pins arranged in a radial array about the crank pin. The connecting rods each connect with a separate one of the knuckle pins. A system of auxiliary cranks are used to limit freedom of movement of the articulation member and to assure that it does not rotate in space as it moves with the crank pin in a circular path around the axis of the crankshaft.

A feature of the described assembly is that it permits the use of identical connecting rods and obviates the need for a number of expensive, specially configured connecting rods on each machine. Another feature lies in the symmetry of the system which facilitates force balancing and minimizes the need for special shaping of parts, compensations for different part masses, and adjustments to assure smooth running operation. Movement ratios and acceleration rates are coordinated and correspond among the connecting rods and pistons so that optimum dynamic mass balancing is possible. Still another advantage is that the system provides great design freedom in the selection of the number of pistons used, stroke lengths, connecting rod lengths, and the like. Moreover, it renders the construction of radial engines sufficiently simple and inexpensive and lightweight to permit their use in fields where they have not heretofore been practical, for example, as prime movers for the driving of small land vehicles such as motorcycles.

The system of auxiliary cranks used to confine the freedom of movement of the articulation member is a significant feature of the invention. This system utilizes at least two auxiliary cranks, each of which has the same crank radius as does the crank pin of the crankshaft. Stated in another way, each of the auxiliary cranks has a pair of end connections whose axes are spaced from each other by a distance equal to that of the radial distance between the axes of the crank pin and the crankshaft.

Each of the auxiliary cranks has one of its end connections pivotally coupled to the body which journals the crankshaft, and the other of its ends pivotally coupled to the articulation member. The auxiliary cranks cooperate to assure that the articulation member does not rotate in space relative to the body as the articulation member moves with the crank pin in a circular path around the axis of the crankshaft.

Since all of the body-journaled ends of the auxiliary cranks rotate exactly synchronously with the crankshaft, an additional feature of the described assembly is that the auxiliary cranks may serve as additional inputs or outputs for the system. Their body-journaled ends may be connected to drive such devices as an ignition distributor shaft, an electrical generator shaft, an oil pump shaft, a radiator coolant pump shaft, a fan shaft, a cam shaft, a super charger shaft, a fuel pump shaft, an injection pump shaft, and the like.

In the crank shaft assembly of the present invention the equations of the normal, single connecting rod gear apply for each of the connecting rods; each piston works independently and remains undisturbed in its movement ratios when one or more other pistons are for any reason removed or intentionally taken out of action. This permits, without difficulty, unloading one or more single pistons, for example, when the machine is not intended to operate at full load, without thereby greatly reducing its efficiency, whether the machine takes the form of an internal combustion engine, a pump, a compressor or other form of reciprocating piston machine.

It is one object of the present invention to provide novel and improved crank assemblies for reciprocating piston machines.

It is another object to provide novel and improved crank assemblies for radial engines, compressors and pumps.

It is a further object to provide novel and improved crank assemblies for relatively low power apparatus wherein relatively smooth, silent operations and freedom from vibration are desired, as in the case of motorcycle engines.

These and other objects and a further understanding of the invention described and claimed in the present application may be had by referring to the following description and the claims taken in conjunction with the accompanying drawings.

BRIEF DESCRIPTION OF THE DRAWINGS

Like reference characters are utilized throughout the drawings to designate like parts.

DESCRIPTION OF THE PREFERRED EMBODIMENT

Figure 1:
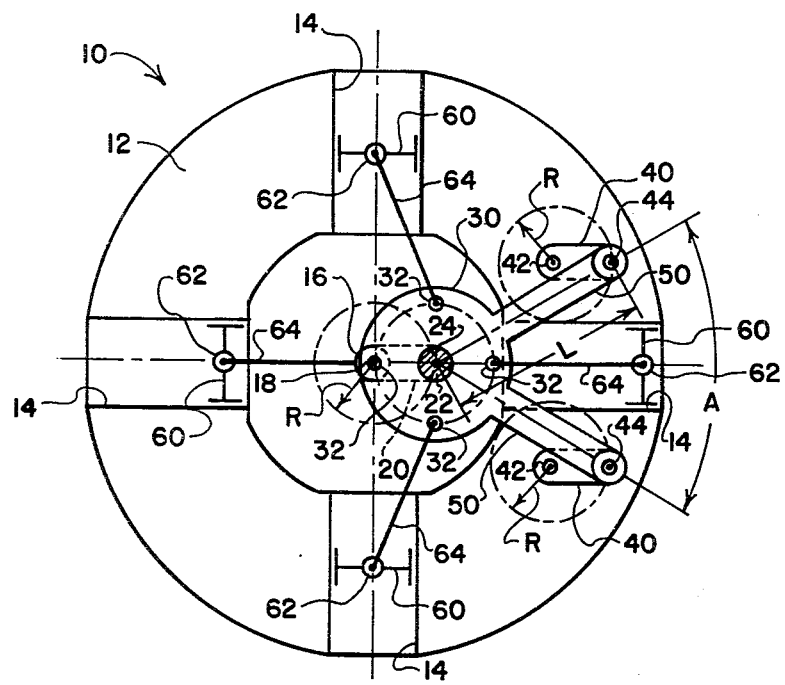
FIG. 1 is a simplified diagrammatic representation of a reciprocating engine with four pistons employing a crank assembly embodying the present invention.
Figure 3:
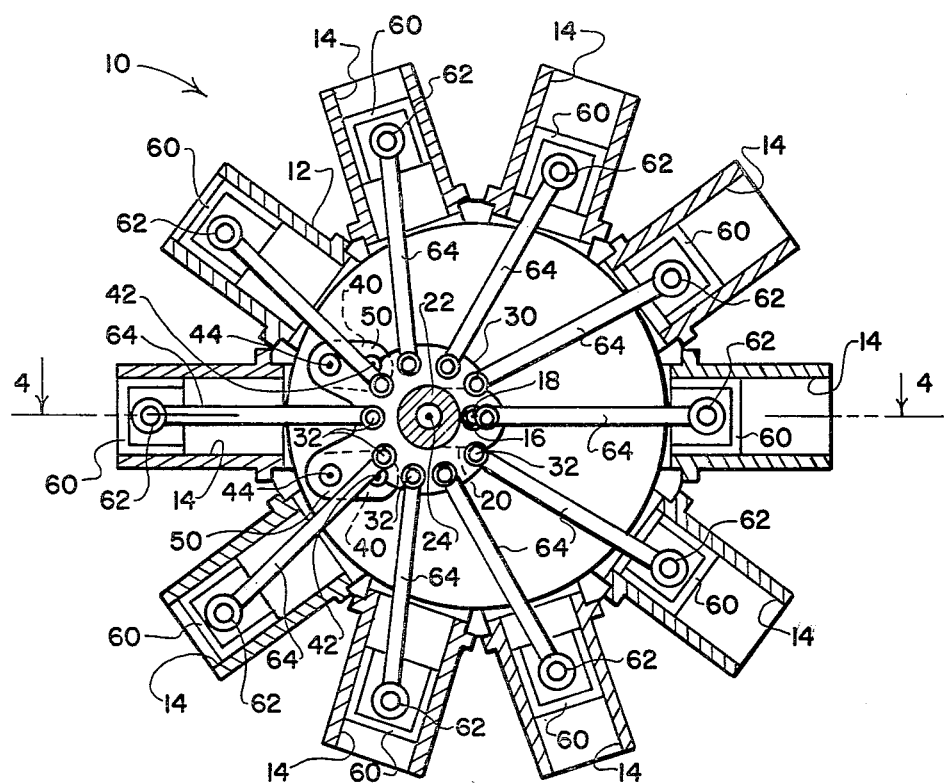
FIG. 3 is a view in cross section of a ten-cylinder radial piston engine from which parts have been omitted which do not form a part of the present invention such as the cylinder heads; and, FIG. 4 is a sectional view as seen from a plane indicated by a line 4—4 of fIG. 3.

Referring to FIGS. 1 and 3, two different reciprocating piston machines are indicated by the common numeral 10. Since, as will become apparent, each of the machines 10 has like parts that can be described by common reference numerals, the description which follows will be found to apply to both of the machines 10.

Referring particularly to FIG. 1, the machine 10 has a body or base structure 12. A plurality of cylinders 14 are supported by the body 12 and are arranged in a radial array with their axes extending in a substantially common plane and intersecting at a common point. A crankshaft 16 is journaled by the body 12 for rotation about an axis 18. The axis 18 extends orthogonally of the common plane of the cylinder axes and extends through the common point of intersection of the cylinder axes.

The crankshaft 16 has a crank arm 20 which extends radially of the axis 18. A crank pin 22 is supported on the crank arm 20 and has an axis 24 which parallels the axis 18. The axes 18, 24 are separated by a distance R.

An articulation member 30 is journaled on the crank pin 22 for movement with the crank pin 22 in a circular path around the crankshaft axis 18. A plurality of knuckle pins 32 are carried by the articulation member 30 and are arranged in a radial array about the crank pin 22. The axes of the knuckle pins 32 extend parallel to the crank pin axis 24 and are equally spaced from the crank pin axis 24.

A system of auxiliary cranks is used to confine the freedom of movement of the articulation member 30 and to prevent its wobbling as the crank pin 22 rotates about the crankshaft axis 18. The auxiliary crank system includes two or more auxiliary cranks 40. Each of the auxiliary cranks 40 carries a body shaft 42 at one end journaled in the body 12, and carries an articulation shaft 44 at the other end journaled by the articulation member 30. The axes of each of the body shafts 42 and their associated articulation shafts 44 are separated by the distance R and extend parallel to the axes 18, 24. This arrangement of auxiliary cranks assures that the articulation member 30 will not rotate in space as it moves in a circular path about the crankshaft axis 18 with the crank pin 22.

The articulation member 30 is preferably provided with elongated arms 50 which extend radially outwardly from the crank pin axis 24 for connection with the articulation shafts 44. The arms 50 have a length L which corresponds to the distance between the body shaft axes 42 and the crankshaft axis 18. If the axes 42 are unequally spaced from the crankshaft axis 18, the lengths of the arms 50 must be correspondingly unequal. The angle A between the arms 50 should be neither zero degrees nor 180 degrees to avoid having the articulation member 30 fall on dead center between the arms 50, but can be any other suitable angle. Where only two articulation arms 50 are used, the angle A is preferably greater than zero degrees and less than 180 degrees, and is more preferably in the range of about 6 to about 120 degrees to provide the greatest degreee of stability. An arrangement wherein the angle A equals 90 degrees as illustrated in FIG. 2, provides maximum assurance against a dead center condition.

Pistons 60 are slidably supported for movement in the cylinders 14. The pistons 60 carry wrist pins 62. Connecting rods 64 drivingly interconnect the articulation member 30 and the pistons 60. Each of the connecting rods 64 has its inner end journaled by a separate one of the knuckle pins 32 and has its outer end journaled by a separate one of the wrist pins 62. The number of each of the knuckle pins 32, pistons 60, wrist pins 62, and connecting rods 64 equals the number of cylinders 14. In FIG. 1, this number is 4 while in FIG. 3 the number is 10.

Figure 2:
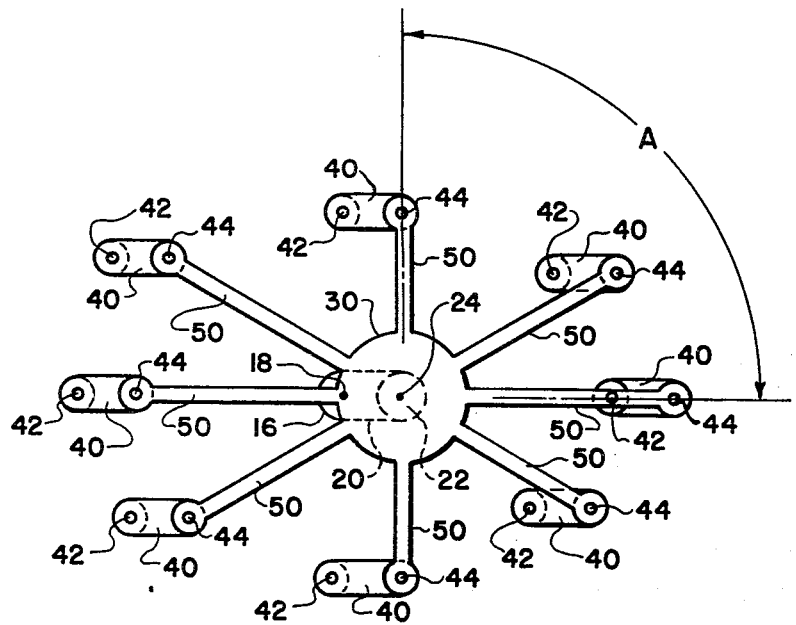
FIG. 2 is a diagram forming a simplified representation of a crank assembly with more than two auxiliary cranks and illustrating the capability of the crank assembly in providing a plurality of power take offs or additional drives.

FIG. 2 illustrates the fact that the invention is not limited in its application to any specific auxiliary crank location so long as the spacings among the auxiliary cranks 40 and the crankshaft 16 are sufficient to avoid interference. FIG. 2 further illustrates that each of the body shafts 42 o.˙the auxiliary cranks 40 can be located at a different distance from the crankshaft axis 18 so long as its associated arm 50 has a corresponding length.

Each of the body shafts 42 of the auxiliary cranks 40 may serve as either a power input or a power output for the system. By way of example, one of the body shafts 42 may constitute the drive shaft of a dynamo, magneto or an electrical generator for providing electrical energy for ignition, battery charging or other auxiliary equipment. Another of the body shafts 42 may connect with the drive shaft of a radiator coolant pump. Another may form the drive shaft of a cooling blower or a fan for ventilating the radiator. Still another of the body shafts 42 may constitute a cam shaft carrying cams for actuating inlet and outlet valves of an internal combustion engine or other valve gear. Another of the body shafts 42 may constitute the drive shaft of a super charger or a super charger blower. Still others may drive a fuel pump, an injection pump, or a distributor shaft for an electrical ignition system in the case of internal combustion engines. Quite similarly, the body shafts 42 may be used to drivingly interconnect the output shafts of a plurality of prime movers.

Figure 4:
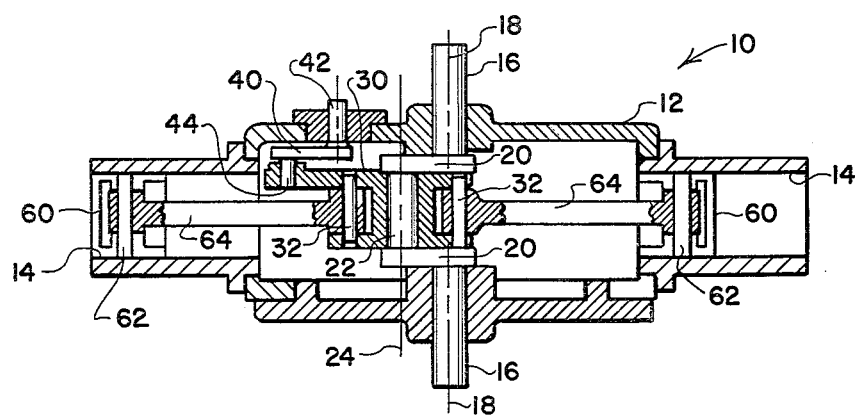

The sectional view of FIG. 4 will assist in visualizing the above described arrangement and combination of parts. While the description and drawings have, for the sake of simplicity, eliminated any reference to the use of bearings and the like, it will be understood that these common parts are preferably included in practicing the invention to assure longevity of service.

Although the invention has been described in various preferred forms with a certain degree of particularity, it is to be understood that the present disclosure of the preferred forms has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. In a machine of the type having a body, a crankshaft journaled by the body for rotation about a crankshaft axis, a crank pin carried on the crankshaft, and a plurality of connecting rods, a crank assembly for drivingly coupling the connecting rods to the crank pin, comprising:
   (a) an articulation member journaled on the crank pin for movement about the axis of the crank pin;
   (b) connection means for pivotally connecting the connecting rods to the articulation member;
   (c) constraining means interconnecting the articulation member and the body of the machine for confining freedom of movement of the articulation member and for preventing it from rotating as it travels with the crank pin in a circular path about the crankshaft axis;
   (d) the constraining means consisting of two auxiliary cranks each having one shaft portion journaled by the body for rotation about a separate auxiliary crank axis, and another shaft portion journaled by the articulation member for movement relative to the body portion about a separate auxiliary shaft portion axis;
   (e) the distances between the axes of the shaft portions of each auxiliary crank being equal to the distance between the axes of the crankshaft and the crank pin; and,
   (f) the crankshaft axis, the crank pin axis, the auxiliary crank axes and the auxiliary shaft portion axes extending in parallel relationship and being arranged such that all of these axes do not extend in a common plane at anytime during rotation of the crankshaft.

2. The machine of claim 1 wherein at least one of the auxiliary cranks is provided with means capable of serving as a power takeoff of the machine.

3. The machine of claim 2 wherein each of the auxiliary cranks is provided with a crankshaft to enable a plurality of different drives or power takeoffs to be associated with the machine.

4. In a machine having a plurality of pistons mounted to travel along radially arranged axes, the improvement comprising:
   (a) a main crank rotatable about a main crank axis and having a crank pin with a crank pin axis;
   (b) a plurality of connecting rods each having an outer end and an inner end, the outer ends being connected to pistons;
   (c) an articulation member interconnecting the main crank and the inner ends of the connecting rods and being journaled by the crank pin for movement about the crank pin axis;
   (d) means constraining the articulation member to motion in which lines therein remain parallel to each other during such motion;
   (e) the constraining means consisting of two auxiliary cranks each having the same crank radius as the main crank, each being arranged parallel thereto, and each having:
      (i) a portion rotatable about a separate fixed axis, the fixed axis extending in parallel non-coplanar relationship with the main crank axis; and,
      (ii) a radially displaced portion carrying a crank pin pivotally connected to the articulation member.

5. The machine of claim 4 wherein the pistons are arranged radially, with axes angularly displaced, and the connecting rod pivots on the articulation member are angularly displaced to conform generally to the angular displacement of the piston axes.

6. The machine of claim 5 wherein the radially disposed pistons serve as the pistons of a radial engine or motor having cylinders arranged equidistant from the axis of the main crank, the connecting rods are substantially identical, of the same length, and the connecting rod pivots on the articulation member are at equal radial distances from the the crank pin axis.

7. The crank machine of claim 5 wherein the piston axes are equally spaced angularly.

8. The machine of claim 4 wherein the articulation member has arms in which pivots are located which interconnect the inner ends and the arms.

9. In a machine of the type having a body, a crankshaft journaled by the body for rotation about a crankshaft axis, a crank pin carried on the crankshaft and having a center axis and a plurality of connecting rods, the improvement of a crank assembly for drivingly coupling the connecting rods to the crank pin, comprising:
   (a) an articulation member journaled on the crank pin for movement about the axis of the crank pin;
   (b) connecting means for pivotally connecting the connecting rods to the articulation member;
   (c) constraining means interconnecting the articulation member and the body of the machine for confining freedom of movement of the articulation member and for preventing it from rotating as it travels with the crank pin in a circular path about the crankshaft axis;
   (d) the constraining means consisting of two auxiliary cranks each having one shaft portion journaled by the body for rotation about separate auxiliary crank axes, and a crank portion carrying an auxiliary crank pin having an auxiliary crank pin axis, the auxiliary crank pins being journaled by the articulation member;

(e) the distances between the auxiliary crank axis and the auxiliary crank pin axis of each auxiliary crank being equal to the distance between the crankshaft axis and the center axis; and, (f) the auxiliary crank pin axes being arranged such that a line connecting the center axis and one of the auxiliary crank pin axes makes an angle with a line connecting the center axis with the other of the auxiliary crank pin axes, and said angle is sufficiently greater than zero and sufficiently less than 180 degrees to prevent a dead center condition of the auxiliary cranks with respect to the main crank.

10. The machine of claim 9 wherein said angle exceeds 60 degrees and is less than 120 degrees.

11. The machine of claim 9 wherein said angle is approximately 90 degrees.

12. In a machine having a plurality of pistons mounted to travel along radially arranged axes, the improvement, comprising:

(a) a main crank having a crank pin with a crank pin axis;

(b) a plurality of connecting rods each having an outer end and an inner end, the outer ends being connected to pistons;

(c) an articulation member interconnecting the main crank and the inner ends of the connecting rods and being journaled by the crank pin;

(d) means constraining the articulation member to motion in which lines therein remain parallel to each other during such motion;

(e) the constraining means consisting of two auxiliary cranks each having the same crank radius as the main crank, each being arranged parallel thereto, and each having:

(i) a portion rotatable about a separate fixed axis; and, (ii) a radially displaced portion carrying an auxiliary crank pin pivotally connected to the articulation member, the auxiliary crank pin interconnecting the radially displaced portion and the articulation member for relative movement about a separate auxiliary axis; and, (f) the auxiliary axes and the crank pin axis extending in parallel, non-coplanar relationship.

* * * * *